(12) United States Patent
Peterson

(10) Patent No.: US 7,993,005 B2
(45) Date of Patent: Aug. 9, 2011

(54) COLOR LASER IMAGE GENERATION

(75) Inventor: Mark David Peterson, Lake Oswego, OR (US)

(73) Assignee: Seiko Epson Corporation, Tokyo (JP)

(*) Notice: Subject to any disclaimer, the term of this patent is extended or adjusted under 35 U.S.C. 154(b) by 675 days.

(21) Appl. No.: 11/558,811

(22) Filed: Nov. 10, 2006

(65) Prior Publication Data
US 2008/0112028 A1    May 15, 2008

(51) Int. Cl.
G03B 21/20 (2006.01)
G03B 21/26 (2006.01)
G03B 21/28 (2006.01)

(52) U.S. Cl. .......... 353/30; 353/85; 353/94; 353/98

(58) Field of Classification Search .......... 250/234; 348/750, 754; 353/30–31, 85, 98–99, 121–122, 353/94, 196.1, 197.1, 199.2, 204.1, 204.4; 359/196.1, 197.1, 199.2, 204.1, 204.4; 372/9, 372/24
See application file for complete search history.

(56) References Cited

U.S. PATENT DOCUMENTS

| | | | |
|---|---|---|---|
| 4,796,964 A * | 1/1989 | Connell et al. ............ | 359/204.1 |
| 5,193,008 A * | 3/1993 | Frazier et al. .............. | 358/1.2 |
| 5,614,961 A * | 3/1997 | Gibeau et al. .............. | 348/750 |
| 5,715,021 A * | 2/1998 | Gibeau et al. .............. | 348/750 |
| 5,774,174 A | 6/1998 | Hardie | |
| 5,834,766 A * | 11/1998 | Suhara ...................... | 250/234 |
| 5,877,886 A * | 3/1999 | Ishii et al. ................. | 359/212.1 |
| 5,920,361 A * | 7/1999 | Gibeau et al. .............. | 348/750 |
| 6,347,002 B1 | 2/2002 | Hagelin et al. | |
| 6,426,781 B1 * | 7/2002 | Lee ............................ | 348/754 |
| 6,606,180 B2 * | 8/2003 | Harada ...................... | 359/204.4 |
| 6,724,509 B2 * | 4/2004 | Lee ............................ | 359/199.2 |
| 6,762,867 B2 | 6/2004 | Lippert et al. | |
| 6,800,844 B2 * | 10/2004 | Kandori et al. ............. | 250/234 |
| 6,900,925 B2 | 5/2005 | Kato et al. | |
| 6,945,652 B2 * | 9/2005 | Sakata et al. ............... | 353/30 |
| 7,012,723 B2 * | 3/2006 | Yoshikawa et al. ........ | 359/204.1 |
| 7,099,060 B2 | 8/2006 | Nanjyo et al. | |
| 7,142,257 B2 * | 11/2006 | Callison et al. ............ | 348/744 |
| 7,163,294 B2 * | 1/2007 | Nambudiri et al. ......... | 353/31 |
| 7,255,445 B2 * | 8/2007 | Kojima ...................... | 353/31 |
| 7,367,682 B2 * | 5/2008 | Dvorkis et al. ............. | 353/101 |
| 7,384,159 B2 * | 6/2008 | Takeda ....................... | 353/94 |
| 7,441,902 B2 * | 10/2008 | Dvorkis et al. ............. | 353/30 |
| 7,475,993 B2 * | 1/2009 | Takeda ....................... | 353/31 |
| 2002/0097477 A1 | 7/2002 | Hagelin et al. | |
| 2003/0184835 A1 | 10/2003 | Goldberg et al. | |
| 2005/0140832 A1 | 6/2005 | Goldman et al. | |
| 2005/0140925 A1 | 6/2005 | Yavid et al. | |
| 2005/0140930 A1 | 6/2005 | Dvorkis et al. | |
| 2005/0141573 A1 | 6/2005 | Yavid et al. | |

(Continued)

FOREIGN PATENT DOCUMENTS

DE    10135418    2/2003

*Primary Examiner* — Tony Ko
*Assistant Examiner* — Jori S Reilly-Diakun
(74) *Attorney, Agent, or Firm* — Kilpatrick Townsend & Stockton LLP

(57) ABSTRACT

An image display device including a plurality of laser light sources arranged to produce angularly offset beams of light, and scanning optics configured to raster scan the angularly offset beams of light simultaneously across separate parallel lines of pixels of a display surface to form an image, wherein each beam of light scans substantially the entire display surface.

19 Claims, 2 Drawing Sheets

U.S. PATENT DOCUMENTS

| | | |
|---|---|---|
| 2005/0157377 A1 | 7/2005 | Goldman et al. |
| 2005/0157763 A1 | 7/2005 | Tan et al. |
| 2005/0243446 A1 | 11/2005 | Wood |
| 2005/0279922 A1 | 12/2005 | Wittenberg et al. |
| 2006/0039056 A1 | 2/2006 | Lee |
| 2006/0039059 A1 | 2/2006 | Ji et al. |
| 2006/0175544 A1 | 8/2006 | Nozaki et al. |
| 2010/0020291 A1* | 1/2010 | Kasazumi et al. .............. 353/38 |

* cited by examiner

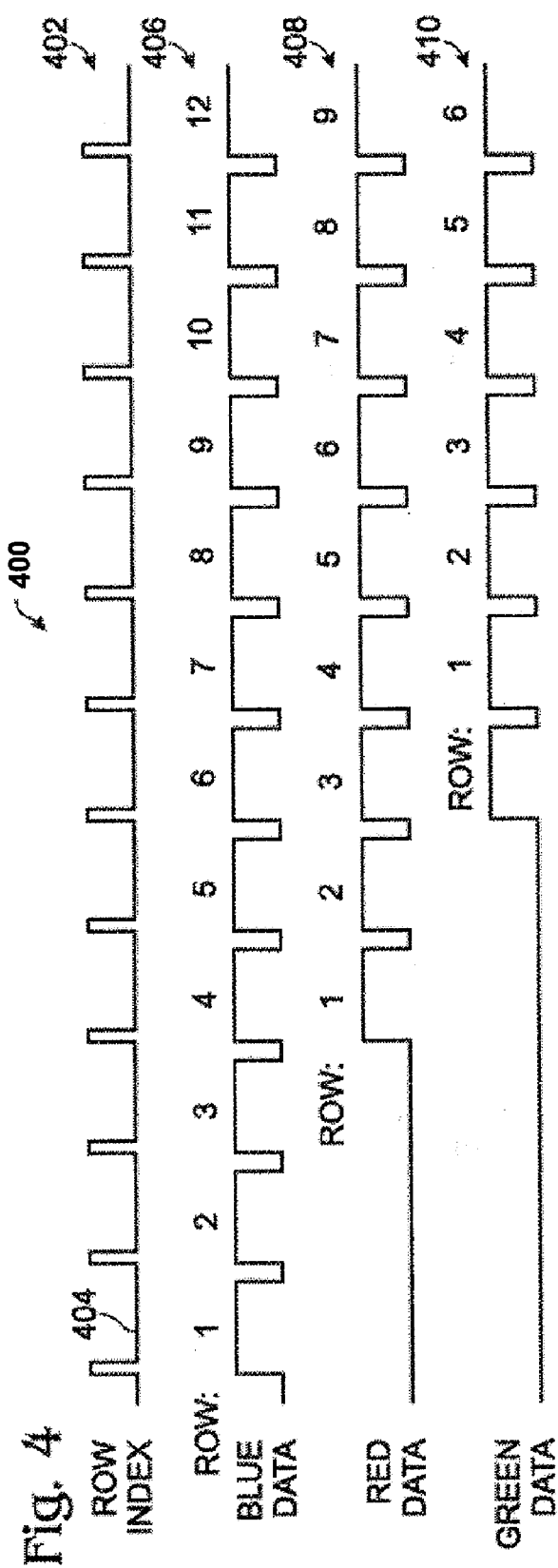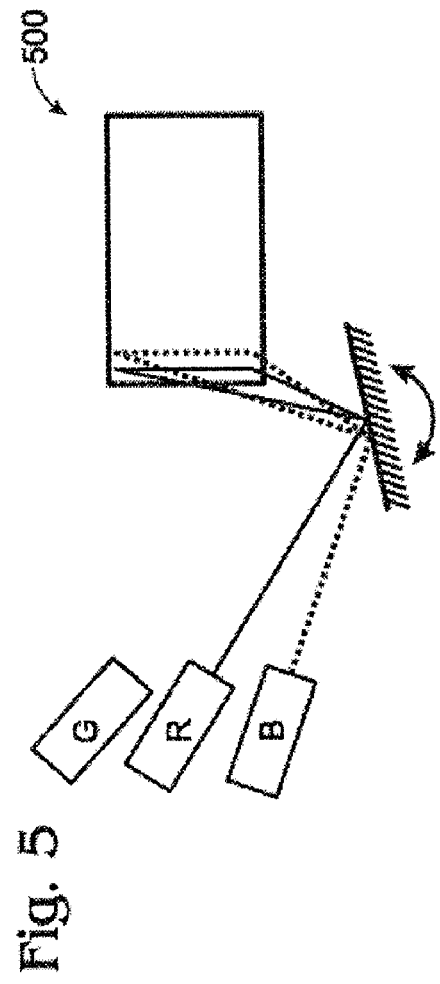
Fig. 4
Fig. 5

US 7,993,005 B2

COLOR LASER IMAGE GENERATION

BACKGROUND

Image projection via laser light sources may offer various advantages over the use of lamps as light sources. For example, diode laser light sources may be substantially smaller and consume less power than conventional lamps, yet may offer sufficient brightness for projection under many light conditions.

Color laser projection systems generally utilize three laser sources, each providing a beam of a primary color. The three beams are combined via dichroic combiner optics to form one white beam, which is raster scanned to create an image for projection. In such systems, the dichroic coatings on the combiner optics may be a significant expense in the overall cost of the projector.

SUMMARY

One disclosed embodiment provides an image display device including a plurality of laser light sources arranged to produce angularly offset beams of light, and scanning optics configured to raster scan the angularly offset beams of light simultaneously across separate parallel lines of pixels of a display surface to form an image, wherein each beam of light scans substantially the entire display surface.

BRIEF DESCRIPTION OF THE FIGURES

FIG. 4 shows an exemplary timing diagram depicting the timing of each laser during the projection of a first twelve rows of pixels utilizing the embodiment of FIG. 2.

FIG. 5 shows a schematic depiction of a spatial relation of two laser beams of another embodiment of a laser projection system during image projection.

DETAILED DESCRIPTION OF THE DEPICTED EMBODIMENTS

Figure 1:
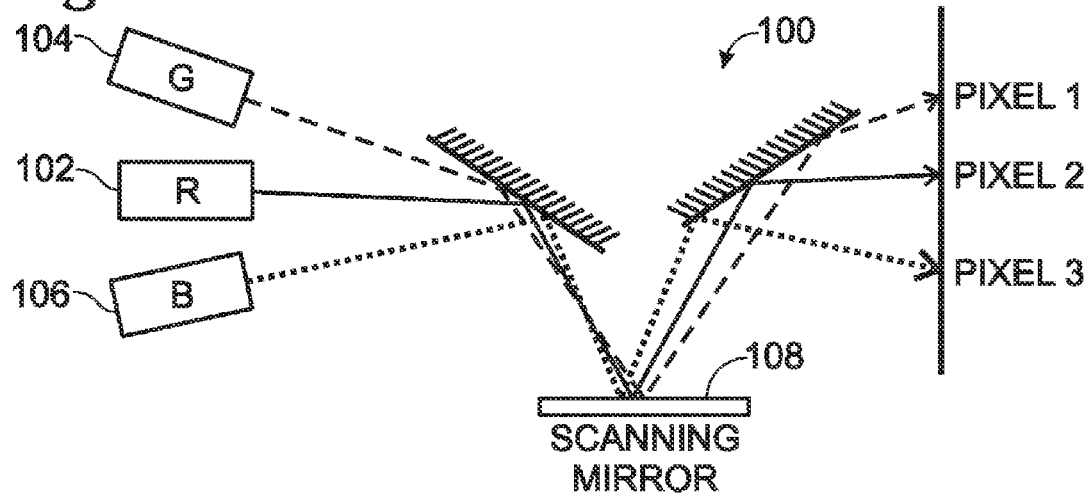
FIG. 1 shows a schematic depiction of an embodiment of a laser projection system according to the present disclosure.

FIG. 1 shows a schematic depiction of an exemplary embodiment of a portion of a laser projection system 100 that avoids the use of dichroic beam combining optics, and that therefore may help to reduce cost of a laser projection system. Projection system 100 includes a red laser source 102, a green laser source 104, and a blue laser source 106 each configured to direct a beam of light toward one or more scanning mirrors 108 for projection onto a display surface 110. Red, green and blue laser sources 102, 104, 106 are aligned with scanning mirror 108 at different angles such that the beams from sources 102, 104 and 106 simultaneously illuminate image pixels in different rows. In this manner, the scanning of scanning mirror 108 causes the different color light beams to simultaneously scan different image rows, thereby allowing the projection of a color image. While one scanning mirror is shown in the depicted embodiment, it will be appreciated that two scanning mirrors (one for each axis of the projected image), or even more scanning mirrors and/or any other suitable scanning optics, may be used in other embodiments.

Figure 2:
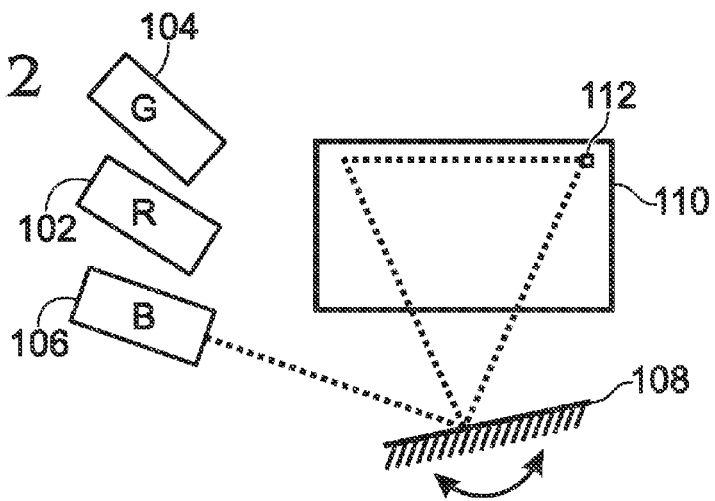
FIGS. 2 and 3 show a schematic depiction of the spatial relation of two of the three laser beams of the embodiment of FIG. 1 during image projection.
Figure 3:
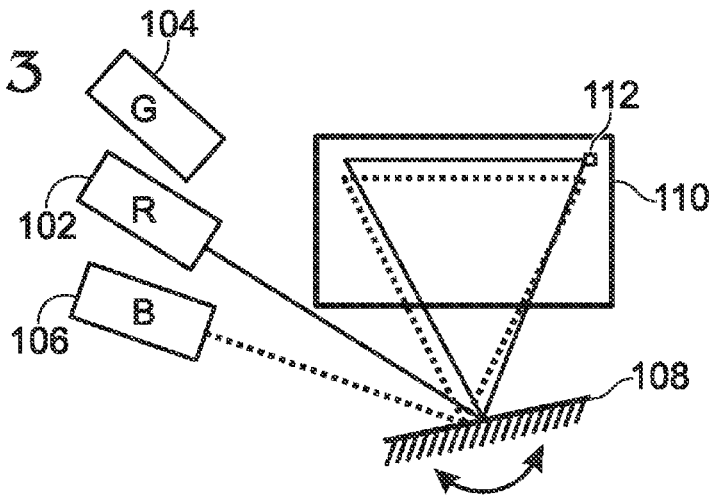

In one exemplary embodiment, illustrated in FIGS. 2 and 3, blue laser 106 scans display surface 110 first, followed by red laser 102 and then green laser 104. As the image is formed, scanning mirror 108 scans all columns of pixels on display surface 110, one row at a time, starting at the top of the image. The first row is created with only blue laser 106 turned on, as shown in FIG. 2. As the scanning mirror moves the blue laser down to row N (wherein N is an integer), red laser 102 is turned on and creates the red field of the first row on display surface 110, as shown in FIG. 3. Similarly, as the scanning mirror moves blue laser 106 down to row 2N and red laser 102 to row N, green laser 104 creates the green field of the first row, completing the first full color row. Colors of the projected light may be controlled by modifying the intensity of light output by laser sources 102, 104 and 106.

Scanning mirror 108 continues to move the laser beams down display surface 110, the beams being separated from adjacent beams by N rows throughout the raster scan, until reaching the bottom of display surface 110. At the bottom of the image, blue laser 106 turns off first, followed by red laser 102 and green laser 104 as the lasers scan the last row of pixels. It will be appreciated that the specific order of the lasers described herein is merely exemplary, and that the lasers may be arranged in any suitable order. For example, in some embodiments, red laser 102 may be scan display surface 110 first, with either green and then blue or blue and then green following, while in other embodiments, green laser 104 may scan first, with red laser 102 and blue laser 106 following, etc. Furthermore, while the depicted embodiment scans across display surface 110 row-by-row, it will be appreciated that the scan may also be performed column-by-column (as shown schematically at 500 in FIG. 5), or in any other suitable manner or orientation.

The angles between the lasers 102-106 are correlated to the separation of the beams on display surface 110. Therefore, errors in the alignment of the lasers 102-106 and/or the angles between the lasers 102-106 may result in image production errors. For example, where the lasers 102-106 are configured to scan vertical columns, if all of the lasers 102-106 are not in the same horizontal plane, an error in the position of the rows of pixels for one or more lasers 102-106 may result. Likewise, for lasers 102-106 configured to scan horizontally (as depicted), if all of the lasers 102-106 are not in the same vertical plane, then an error in the position of the columns of pixels for one or more lasers 102-106 may result. Similarly, errors in the spacing of rows or columns may occur if the lasers are in the correct plane but are separated by an incorrect angle or angles.

To help prevent and/or correct such errors, a photodetector may be included to measure and calibrate the positions of the lasers relative to each other. FIGS. 2 and 3 show schematic examples of a calibration photodetector 112. In the depicted embodiment, the photodetector 112 is positioned after scanning mirror 108, and outside of the field of view of display surface 110. Photodetector 112 is sufficiently accurate to measure the scanning laser spot to one pixel in both the vertical and horizontal directions. This allows errors in the position of a laser to be determined by comparing the actual location of the laser beam to a calculated location of the laser beam in light of a number of pixels scanned in a vertical and/or horizontal direction. This also may allow a position of a laser to be adjusted, either automatically or manually (for example, by movement of a laser by one more motors, by adjustment of corrective optics, etc.), to correct the positioning or alignment of the lasers. Alternatively, photodetector 112 may be used only during manufacturing calibration with the relative laser positions stored electronically in the laser module. In this case, the detector could be in the field of view and potentially at the screen position as well. It will be appreciated that the location of photodetector 112 depicted in FIGS. 2 and 3 is shown for the purpose of example, and that a photodetector may be included in any other suitable location.

FIG. 4 illustrates a timing diagram 400 showing an exemplary embodiment of a timing of the sequential illumination of rows of pixels via the blue, red and green lasers at the top of an image. The top row 402 in timing diagram 400 depicts an index of 12 rows of pixels of an image, wherein each pixel is represented by a space 404 between peaks. The second row 406 depicts the relative progression of blue laser 106 from pixel row 1 to row 12, the third row 408 depicts the relative progression of red laser 102, and the fourth row 410 depicts the relative progression of green laser 104. In this exemplary embodiment, it can be seen that blue laser 106 scans three rows of pixels before red laser 102 turns on. Blue laser 106 and red laser 102 then scan three further rows of pixels, separated by three rows of pixels during the scanning, before green laser 104 turns on and begins to scan the first row of pixels. In this manner, blue laser 106, red laser 102 and green laser 104 scan the entire image. While the depicted diagram 400 shows each laser beam spaced by three rows from adjacent laser beams, it will be appreciated that the laser beams may be spaced by any suitable number N of pixel rows, either more or fewer than three. The spacing of the laser beams in some embodiments may be dictated by the geometry of the laser sources, by the geometry of the projection device, by the distances between the laser sources and the display surface, or by any other suitable factor or factors.

In some embodiments, it may be desirable to utilize a low number N of lines of pixels by which the laser beams are separated. This is because the brightness of an image produced by the above-described method may be slightly reduced compared to systems in which the three colored beams are combined into a single white beam, as scanning mirror 108 must overscan by 2N lines of pixels on both the top and bottom of the image (for a total of 4N additional lines of pixels) so that all lines of pixels are scanned by all three laser beams. Without wishing to be bound by theory, this overscanning may cause a reduction of brightness on the order of 100%−(2N/image height). Therefore, the lower the number N of lines of pixels separating the laser beams during scanning, the lower the reduction in image intensity of the projected image compared to a system with dichroic beam combiners.

The above-described arrangement of lasers and method of raster scanning an image for projection may help to overcome cost constraints and other various problems associated with the use of dichroic beam combiners in known laser projection systems. This may help to make the disclosed optical system more suitable for use in small-scale projection systems, including but not limited to pocket-sized systems, in which low cost may be an important purchasing factor. While the disclosed arrangement of lasers produces beams that are separated by N rows of pixels, it will be appreciated that the lasers may produce beams that are separated by N columns of pixels, N diagonal rows of pixels, or any other suitable orientation of lines of pixels, and that scanning may be performed in any suitable orientation or manner.

It will further be understood that either fewer or more than the three colors of lasers could be used in system 100. For example, additional color or white or other color lasers may be provided at different angles both horizontally and vertically. Each additional laser may require farther overscan of the mirrors. This may result in less efficiency, but also may provide the benefits of additional color gamut, brightness, and/or other such features.

Furthermore, although the present disclosure includes specific embodiments, specific embodiments are not to be considered in a limiting sense, because numerous variations are possible. The foregoing embodiments are illustrative, and no single feature, component, or action is essential to all possible combinations that may be claimed in this or later applications. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "a" or "a first" element or the equivalent thereof. Such claims should be understood to include incorporation of one or more such elements, neither requiring nor excluding two or more such elements. Further, ordinal numbers, such as first, second, and third, for identified elements or actions are used to distinguish between the elements and actions, and do not indicate a required or limited number of such elements or actions, nor a particular position or order of such elements or actions unless otherwise specifically stated. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. An image display device, comprising:
a plurality of laser light sources arranged to produce angularly offset beams of light; and
scanning optics configured to raster scan the angularly offset beams of light simultaneously across separate parallel lines of pixels of a display surface to form an image,
wherein each beam of light scans substantially the entire display surface;
wherein the plurality of laser light sources are on at the same time;
wherein the image comprises a plurality of separate lines of pixels; and
wherein the separate parallel lines of pixels of the display surface each comprise different lines of pixels of the image.

2. The display device of claim 1, wherein the separate parallel lines of pixels are rows of pixels.

3. The display device of claim 1, wherein the plurality of laser light sources comprises red, green and blue laser light sources.

4. The display device of claim 1, wherein the separate parallel lines of pixels are separated by N lines of pixels.

5. The display device of claim 1, further comprising a display surface.

6. The display device of claim 1, further comprising a photodetector disposed outside of a field of view of the image display device.

7. The display device of claim 1, wherein the scanning optics comprise a scanning mirror.

8. An image display device, comprising:
a first laser light source configured to produce a first beam of light;
a second laser light source configured to produce a second beam of light at an angle to the first beam of light; and
a scanning mirror configured to simultaneously raster scan the first beam of light and the second beam of light at different angles across substantially an entire display surface to form an image;

wherein the first beam of light illuminates a first line of pixels of the image; and wherein the second beam of light illuminates a second line of pixels of the image.

9. The image display device of claim 8, wherein the angle corresponds to a separation in the laser beams of N lines of pixels of the image, wherein N is an integer.

10. The image display device of claim 9, further comprising a third laser light source configured to produce a third beam of light at angles to each of the first and second beams of light such that the third beam of light is separated from the second beam of light by N lines of pixels of the image and from the first beam of light by 2N pixels of the image, and wherein the scanning mirror is configured to scan a number of lines of pixels in the image plus at least 4N additional lines of pixels.

11. The image display device of claim 8, further comprising a third laser light source, wherein each laser light source is configured to produce light of a different color.

12. The image display device of claim 8, further comprising a display surface.

13. A method of displaying an image with an image display device, the method comprising:

producing a plurality of beams of light via a plurality of lasers, wherein each beam of light is angularly offset from the other beams of light; and simultaneously scanning the plurality of beams of light along separate parallel lines of pixels of a display surface to form the image, wherein each beam of light is scanned across substantially an entire area of the display surface;

wherein the plurality of laser light sources are on at the same time; and wherein the separate parallel lines of pixels of the display surface each comprise different lines of pixels of the image.

14. The method of claim 13, wherein simultaneously scanning the plurality of beams of light along separate parallel lines of pixels comprises scanning the plurality of beams of light along separate parallel rows of pixels.

15. The method of claim 13, wherein simultaneously scanning the plurality of beams of light along separate parallel lines of pixels comprises scanning the plurality of beams of light along parallel columns of pixels.

16. The method of claim 13, wherein simultaneously scanning the plurality of beams of light comprises simultaneously scanning at least three beams of light along three separate parallel lines of pixels.

17. The method of claim 13, wherein the lines of pixels have a separation of N lines of pixels, wherein N is an integer.

18. The method of claim 17, wherein the image display device includes a scanning mirror, and wherein scanning the plurality of beams of light comprises scanning the scanning mirror at least a number of lines of pixels in the image plus at least 4N additional lines of pixels per image.

19. The method of claim 13, further comprising detecting a position of at least one of the beams of light with a photodetector and determining an alignment of the laser that produces the beam of light via a signal from the photodetector.

* * * * *